United States Patent [19]
Reichow et al.

[11] Patent Number: 5,269,388
[45] Date of Patent: Dec. 14, 1993

[54] WEIGHING BED

[75] Inventors: Keith W. Reichow, Renton; Robert L. Hildebrant, Issaquah; Richard A. Butler, Renton, all of Wash.

[73] Assignee: Stress-Tek, Inc., Renton, Wash.

[21] Appl. No.: 791,565

[22] Filed: Nov. 12, 1991

[51] Int. Cl.⁵ .................. G01G 19/52; A61G 7/06
[52] U.S. Cl. .......................... 177/144; 5/600
[58] Field of Search ...................... 177/144; 5/600

[56] References Cited

U.S. PATENT DOCUMENTS

4,926,951  5/1990  Carruth et al. ............... 177/144
4,934,468  6/1990  Koerber, Sr. et al. .......... 177/144

Primary Examiner—George H. Miller, Jr.
Attorney, Agent, or Firm—Jensen & Puntigam

[57] ABSTRACT

A weighing bed (10) which includes a patient support assembly (12), an upper bed frame (14) and a lower bed frame (16). Linkage assemblies and actuators, powered by motors, provide movement capability for the bed (10). Mounted on both sides of the lower frame (16) are load cells (52, 53), each of which has connected thereto a U-shaped rigid bracket (72). First link member (84) connects one end (76) of bracket (72) to a foot portion of the upper bed frame (14), while second and third link members (90, 92) connect the other end (75) of the bracket (72) to a head end of the upper bed frame (14).

13 Claims, 4 Drawing Sheets

WEIGHING BED

TECHNICAL FIELD

This invention relates generally to hospital beds and the like, and more particularly concerns an improved weighing system for use with such beds.

BACKGROUND OF THE INVENTION

It is frequently desirable to accurately monitor a patient's weight during the course of a hospital stay. This requires frequent weighing of the patient. However, it is often impractical, if not impossible, to remove patients from a hospital bed to weigh them, particularly on a regular or frequent basis. In order to overcome this difficulty, systems have been designed to weigh patients while they remain in the hospital bed. An example of one such system is shown in U.S. Pat. No. 4,926,951 to Carruth et al. However, difficulties have been experienced with the accuracy, repeatability and long-term reliability of existing systems.

This is due to a variety of reasons, including the many possible positions of the patient on the bed, and the inability of such systems to combine sufficient sensitivity to produce good weighing results and sufficient durability to withstand the high forces typically present on various portions of the bed during normal use thereof. For instance, the weighing systems of such beds are subject to large twisting forces, due to complex bed construction and the effect of certain bed positions, such as the Trendellenberg position. These forces will vary in magnitude, depending upon the particular positional configuration of the bed and the position of the patient on the bed. In addition, movement of the bed from place to place, and frequent change in bed positional configuration (from one configuration to another) tend to compound the difficulty of maintaining high accuracy for a weighing system on such beds.

All of the above reasons combine to make accurate weighing of patients in a hospital bed a difficult engineering and design problem.

DISCLOSURE OF THE INVENTION

Accordingly, the present invention includes means for receiving a patient; an upper bed frame, having a foot end and a head end, for supporting the patient receiving means; a lower bed frame; at least one load cell connected to the lower bed frame; a rigid load cell bracket, having a foot end and a head end, connected to the load cell, the bracket extending along the length of the load cell; first linking means linking the foot end of the bracket to the upper bed frame; and second linking means linking the head end of the bracket to the upper bed frame, such that the upper bed frame is movable relative to the lower bed frame and such that the load cell is responsive to the weight of the patient.

BEST MODE FOR CARRYING OUT THE INVENTION

Figure 1:
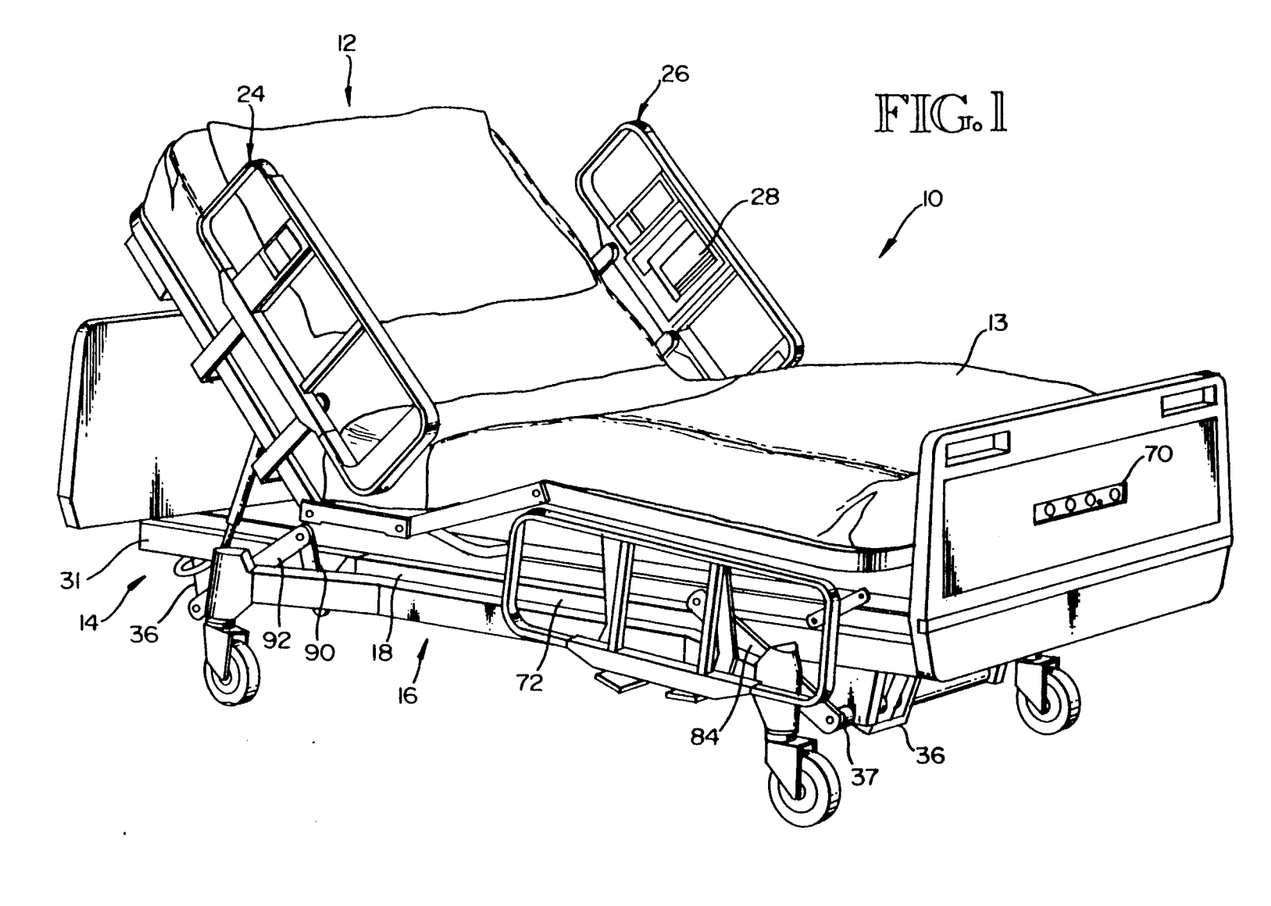
FIG. 1 is an elevational view showing a representative hospital bed which includes the weighing assembly of the present invention.
Figure 2:
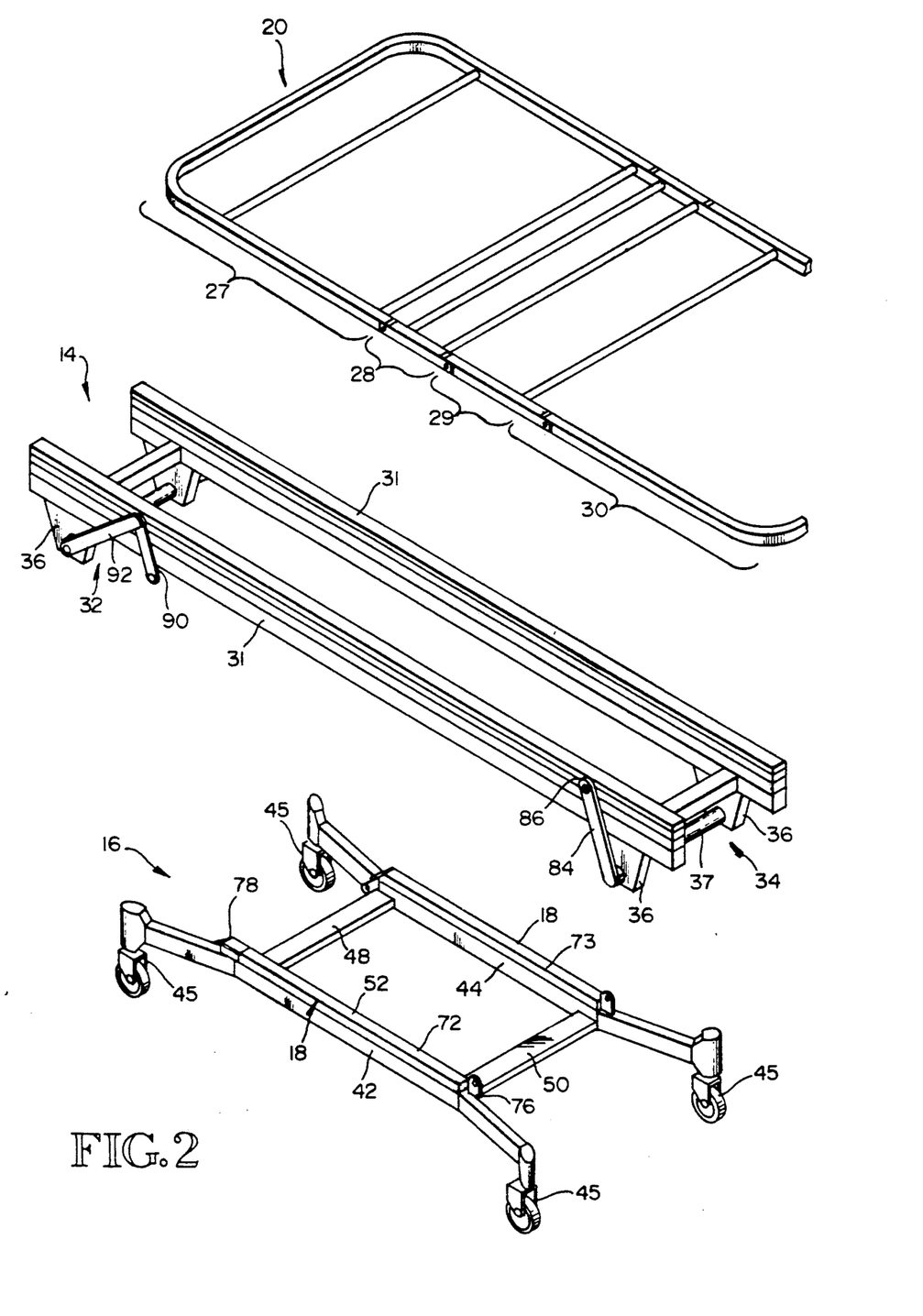
FIG. 2 is an exploded view of a portion of the bed of FIG. 1 including a lower bed frame with a load cell assembly, an upper bed frame and an articulated patient support frame.

The improved weighing bed of the present invention is shown generally at 10 in FIG. 1. The weighing bed 10, portions of which are also shown in FIG. 2, includes an articulated patient support assembly 12, an upper bed frame 14 and a lower bed frame 16. A weighing assembly, shown generally at 18, is positioned in the embodiment shown between upper bed frame 14 and lower bed frame 16, and is mounted on the lower bed frame. The patient support assembly 12 includes an articulated frame 20 (FIG. 2) and a flexible mattress 13, upon which the patient lies, as well as side panels 24 and 26, which include operational controls 28 for the bed 10. The articulated frame 20 comprises four successive sections 27-30 of selected dimensions, as shown in FIG. 2. Each section is connected to the adjacent sections and can rotate relative thereto. This arrangement provides the overall range of motion and the positional capability necessary for a hospital bed. The operational controls 28 connect with conventional motors (not shown) and associated mechanisms positioned beneath articulated frame 20 to provide the necessary powered movement for the bed.

The upper bed frame 14 provides direct support for the patient support assembly 12 and, in the embodiment shown, serves as a base or mounting structure for the motors and associated mechanisms, which move the patient support assembly into the desired positional configurations. The upper bed frame 14 includes two elongated, generally straight longitudinal members 31-31, which extend for the length of the bed. While each longitudinal member 31 is shown as a single unit, they each could be two units telescopically joined together. The two longitudinal members 31-31 are joined together by two lateral brace assemblies 32 and 34. The brace assemblies 32, 34 generally each include bracket-like members 36-36, which depend from the head and foot ends of both of the longitudinal members, with a generally tubular support element 37 which extends between each set of brackets 36-36.

The lower bed frame 16 includes two elongated longitudinal members 42 and 44. The longitudinal members flare outwardly in the vicinity of each end, terminating in caster assemblies 45-45. The caster assemblies, of course, permit the bed to be conveniently moved from place to place. Extending between the two longitudinal members 42 and 44 of the lower bed frame are two lateral braces 48 and 50. The lateral braces are positioned approximately at the point along the length of each longitudinal member where the longitudinal member begins to flare outwardly.

The patient support assembly 12, the upper bed frame 14 and the lower bed frame 16 are generally conventional in design and construction. Typically, those portions are made from steel, with the component portions thereof being welded together. Such an arrangement provides the required stability and strength needed for a hospital bed. The controls and motors, gears and hydraulic actuators to control the movement and the required bed position are also generally conventional. The actual configuration of the various portions of the bed described above may, however, vary within the spirit of the present invention.

The weighing system or assembly of the present invention, in the embodiment shown, includes two load cells 52, 53, each load cell being approximately 24 inches long by 1½ inches high by ¾ inches wide, and made from aluminum. The load cells are secured to the lower bed frame, in particular, to the respective longitudinal members 42 and 44 of the lower bed frame, through an elongated mounting plate 57. Screws 60-60 extend through three spaced openings 54, 56, and 58 in the load cell and into mounting plate 57, which is secured to the lower bed frame, such as by welding or the like. The lower surface 61 of the load cell in the vicinity of each end 67a, 67b thereof is slightly relieved over a length of approximately 4 inches, leaving a gap 71 (FIG. 5) between the lower surface of the relieved portions of the load cell and the mounting plate 57 of approximately 50-100 thousandths of an inch.

Extending laterally through the load cell, from side to side, in the vicinity of the opposing ends thereof, above the relieved portions of the lower surface, are cutout portions 62 through 65. Each cutout portion (i.e. cutout portion 64 in FIG. 5) includes ¾ circle portions 64a, 64b connected by two flat portions 64c, 64d. Positioned in the cutout portions and more particularly on the circle portions thereof are conventional strain gages, such as shown at 66 in FIG. 5. The strain gages are connected electrically into a conventional Wheatstone bridge arrangement, with temperature compensating elements, shown representationally at 68, the output of which is connected via a cable 69 to a processing circuit and weight indicator 70.

Figures 4, 5:
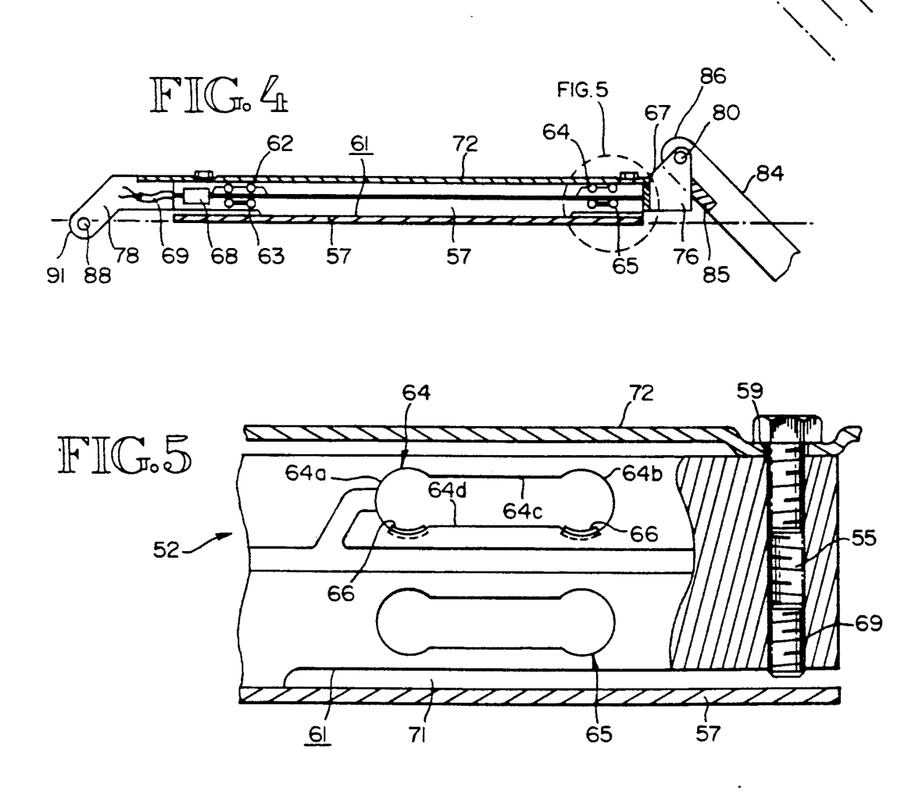
FIG. 4 is a cross-sectional view taken along lines 4—4 in FIG. 3.
FIG. 5 is a close-up view of a portion of FIG. 4.

Load cell brackets 72-72 are bolted to the top of each load cell 52, 53 in the vicinity of the opposite ends thereof, outboard of the cutout portions 62-65, which in turn are generally outboard of the nearest opening in the load cell by which the load cell is bolted to the mounting plate 57. FIG. 5 shows the connection of the bracket 72 to the load cell 52. The bracket 72 includes a opening 59 through which a screw extends into a threaded opening 55 in the load cell 52. The area immediately surrounding opening 59 is dimpled inwardly and it is this area only which contacts the upper surface of the load cell 52. A set screw 69 is positioned in the threaded opening 59 at a desired height for precision overload adjustment.

Figure 3:
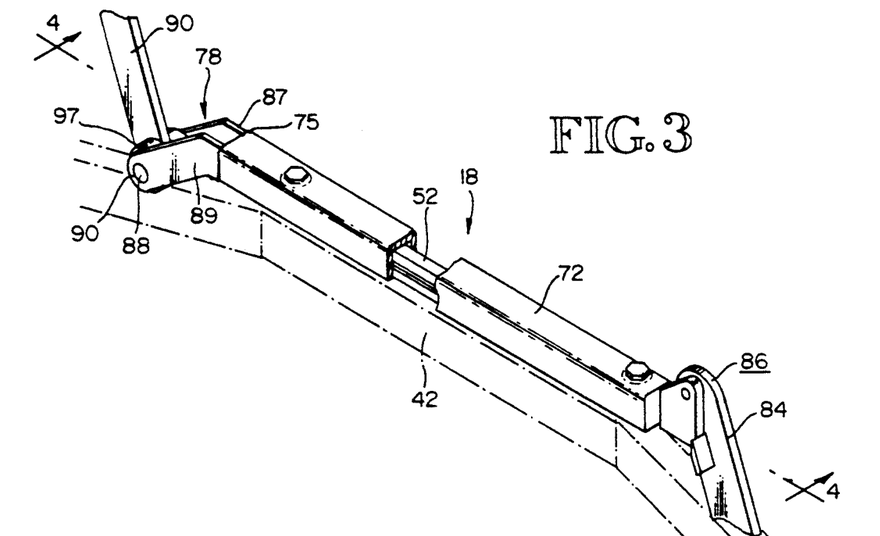
FIG. 3 is a perspective view showing a portion of the bed weighing assembly of the present invention.
Figure 6:
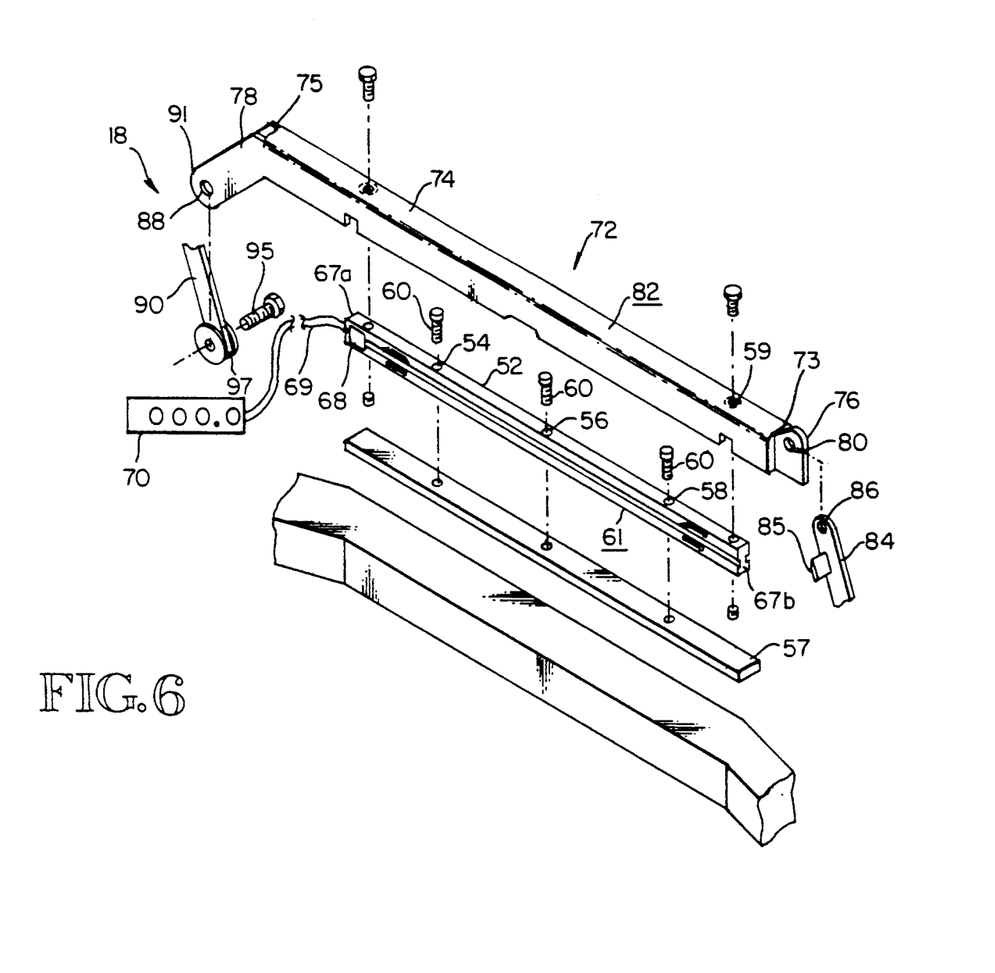
FIG. 6 is an exploded view of the weighing assembly of the present invention.

Referring to FIGS. 3, 4 and 6, load cell bracket 72 in the embodiment shown covers load cell 52 and extends beyond the respective ends of the load cell. The structure described below with respect to the bracket 72 used with load cell 52 is the same for the bracket used with load cell 53 on the other side of the bed. In the embodiment shown, load cell bracket 72 includes three portions, an elongated main section 74, an ear portion 76 extending from one end 73 thereof, and an angled portion 78 extending from the other end 75 thereof.

The main section 74 is U-shaped in cross section, approximately 1½ inches wide by 2 inches deep. The load cell bracket 72 is made from 3/16 inch steel so that it is quite rigid and strong, for reasons clarified below. The main portion 74 of the bracket is approximately 32 inches long, such that it extends several inches beyond each end of the load cell when it is in place, bolted to the load cell. The ear portion 76 is a 3/16 inch steel plate which extends approximately 2 inches from the one end 73 of the main portion 74, and is typically attached to the main portion 74 by welding. The ear portion in the embodiment shown is approximately 2 inches wide by 3 inches high, with the top edge being curved and extending at its highest point approximately 1½ inches above the upper surface 82 of main portion 74. The ear portion 76 has an opening 80 therethrough, approximately ½ inch in diameter and approximately at the level of the upper surface 82 of the main portion 74.

Opening 80 accommodates the rotatable attachment of a first link member 84, which extends from ear portion 76 of bracket 72 to the upper bed frame 14. In the embodiment shown, the first link member 84 is approximately 12 inches long by 1½ inches wide and is made from 3/16 inch steel stock. One end 86 of link 84 is secured by means of a pin, bolt or the like to the ear portion 76 of the load cell bracket 72, so that link 84 is rotatable relative thereto. The other end of link 84 is in the embodiment shown rotatably attached to the foot end lateral brace assembly 34 (in particular, at the end of tubular support 37) of the upper bed frame 14.

A stop element 85 (FIG. 4) is positioned on link 84 such that it abuts against ear 76 in the extreme position of link 84. Very large forces are focused at the end of bracket 72 adjacent link 84 during movement of the bed, particularly in the Trendellenberg positions. These forces would ordinarily be sufficient to damage the end of a load cell. However, the strong bracket arrangement, and the manner of attaching the bracket to the load cell at the opposing ends thereof, results in the bracket being able to absorb the high forces without the load cell being damaged, while at the same time permitting the load cell to absorb the vertical load of the patient and be sensitive enough to give an accurate weight measurement.

The angled portion 78 of bracket 72, which extends from end 75 thereof, comprises two elongated plates 87 and 89, which in the embodiment shown are extensions of the respective wall portions of the U-shaped main portion 74 of the bracket. In the embodiment shown, the plates 87 and 89 are approximately 6¼ inches long by 1¾ inches wide and extend at an angle of approximately 30° downwardly from the end 75 of main portion 74. Near the free ends 91 of plates 87, 89 are openings 88. A mounting bolt 95 (FIG. 6) fits through the openings 88 in the plates 87 and 89 and into the lower bed frame. One end 97 of a second link member 90 is rotatably positioned on the bolt 95, between the two plates 87, 89. Second link 90 extends upwardly from the mounting bolt and is approximately 12 inches long by 1½ inches wide.

One end of a third link member 92 (FIG. 2) is rotatably attached to the other end of the second link member 90. The third link 92 in the embodiment shown is approximately 10 inches long by 1½ inches wide. The other end of third link 92 is rotatably attached to the head end lateral brace assembly 32 (the end of tubular support 37 thereof) of upper bed frame 14, as shown in FIG. 2.

As the bed moves into its various positions, load cell bracket 72 will remain in fixed position relative to the lower bed frame 16 and all other parts of the system. The first and second link members 84, 90 will rotate about their respective points of connection, which are fixed, on the ear portion 76 and the angled portion 78, respectively, of the bracket 72. The first link member 84 also rotates about its point of connection with the upper bed frame at foot end tubular support 37. The second link member 90 also rotates about its point of connection with the third link member 92, while the third link member rotates about its connection with the upper bed frame at head end tubular support 37. The entire upper bed frame 14 moves as the bed position changes. The load cells are mounted to the lower bed frame and are hence directly responsive to the vertical loads produced by the patient in the bed. The load cells are sufficiently sensitive to produce accurate weighing results within a fraction of a pound. The bracket 72 takes up the large horizontal and twisting forces generated by the linkages as the bed moves into various positions, thereby protecting the load cell from damage.

Hence, a preferred embodiment of the present invention has been described for purposes of illustration. It should be understood that various changes, modifications and substitutions may be made without departing from the spirit of the invention, which is defined by the claims which follow:

What is claimed is:

1. A weighing bed, comprising:
   means for receiving a patient;
   an upper bed frame, having a foot end and a head end, for supporting the patient receiving means;
   a lower bed frame;
   at least one load cell connected to the lower bed frame;
   a rigid load cell bracket, having a foot end and a head end, connected to the load cell such that the weight of the patient is transferred to the load cell through the bracket, the bracket extending along the length of the load cell;
   first linking means linking the foot end of the bracket to the upper bed frame; and
   second linking means linking the head end of the bracket to the upper bed frame, such that the upper bed frame is movable relative to the lower bed frame for substantial height adjustment of the bed and such that the load cell is responsive to the weight of the patient.

2. An apparatus of claim 1, wherein the first linking means includes a first link member rotatably secured at one end thereof to the foot end of the bracket and rotatably secured at the other end thereof to the upper bed frame in the vicinity of the foot end thereof, and wherein the second linking means includes second and third link members, the second link member rotatably connected at one end to the head end of the bracket and at the other end to the third link member, the third link member in turn being rotatably connected to the upper bed frame in the vicinity of the head end thereof.

3. An apparatus of claim 2, wherein the connections between the first link member and the upper bed frame, the second link member and the third link member, and the third link member and the upper bed frame move as the upper bed frame moves in relation to the lower bed frame, and wherein the connections between the first and second link members and the bracket remain fixed in position.

4. An apparatus of claim 1, wherein the load cell bracket is U-shaped in cross section and extends around and over the load cell and beyond the ends of the load cell, the bracket having an ear-like portion at the foot end, and an angled portion comprising two parallel elongated plates at the head end, wherein the first and second link members are rotatably connected, respectively, to the ear portion and the angled portion of the load cell bracket.

5. An apparatus of claim 4, wherein the angled portion extends downwardly at an angle of approximately 30° from the remainder of the bracket.

6. An apparatus of claim 1, wherein the load cell is fixedly connected to the lower bed frame and the load cell bracket is fixedly connected to the load cell.

7. An apparatus of claim 1, including a load cell and a load cell bracket and first and second linking means associated therewith, on each side of the bed.

8. An apparatus of claim 1, wherein the load cell is elongated, and includes a lower surface which has relieved portions in the vicinity of the opposing longitudinal ends thereof, wherein the load cell further includes a plurality of cutout portions located above the relieved portions, and wherein strain gages are mounted in the cutout regions, and connected in an electrical bridge arrangement.

9. An apparatus of claim 1, wherein the load cell is elongated and includes strain sensing regions in the vicinity of the opposing ends thereof, and wherein the bracket is connected to the load cell in the vicinity of the opposite ends thereof, outboard of the strain sensing regions.

10. An apparatus of claim 9, wherein the bracket includes openings in an upper surface thereof for connecting the bracket to the load cell and wherein the immediate surrounding area of the openings extends slightly downwardly from the remainder of the upper surface to contact an upper surface of the load cell.

11. An apparatus of claim 1, wherein the load cell includes a lower surface which has relieved portions in the vicinity of the opposing ends thereof and wherein the load cell includes openings which extend upwardly into the load cell from the lower surface in the relieved portions and adapted to receive elements which may be adjusted to provide selected clearance between the elements and the surface adjacent the relieved portions to provide selected overload protection.

12. A weighing bed, comprising:
    a bed assembly for receiving a patient, the bed assembly including at least two portions movable relative to each other to provide a substantial height adjustment for the bed;
    at least one load cell connected to one portion;
    a rigid load cell bracket connected to the load cell and extending for a substantial portion of the length of the bed; and
    linking means connecting the opposing ends of the bracket to the other portion of the bed assembly in a manner to permit substantial movement of the two portions relative to each other and such that the load cell is responsive to the weight of the patient on the bed assembly.

13. An apparatus of claim 12, including means for moving the weighing bed into various positional configurations, including means for moving the second portion of the bed relative to the first portion.

* * * * *

UNITED STATES PATENT AND TRADEMARK OFFICE
CERTIFICATE OF CORRECTION

PATENT NO. : 5,269,388
DATED : December 14, 1993
INVENTOR(S) : Keith Reichow et al.

It is certified that error appears in the above-identified patent and that said Letters Patent is hereby corrected as shown below:

Column 5, claim 1, line 20, should read as follows:

1. A weighing bed, comprising:

means for receiving a patient;

an upper bed frame, having a foot end and a head end, for supporting the patient receiving means;

a lower bed frame, which includes two longitudinal members and at least one cross member connecting the longitudinal members;

first and second load cells rigidly connected, respectively, to the two longitudinal members of the lower bed frame;

first and second rigid load cell brackets, each having a foot end and a head end, connected to the load cells such that the weight of the patient is transferred to the load cells through the brackets, the brackets extending along the length of the load cells;

first linking means linking the foot end of the brackets to the upper bed frame; and second linking means linking the head end of the brackets to the upper bed frame, such that the upper bed frame is movable relative to the lower bed frame for substantial

UNITED STATES PATENT AND TRADEMARK OFFICE
CERTIFICATE OF CORRECTION

PATENT NO. : 5,269,388
DATED : December 14, 1993
INVENTOR(S) : Keith Reichow, et al It is certified that error appears in the above-indentified patent and that said Letters Patent is hereby corrected as shown below:

height adjustment of the bed and such that the load cells are responsive to the weight of the patient.

Claim 12 should read as follows:

Column 6, claim 12, line 3, should read as follows:

a bed assembly for receiving a patient, the bed assembly including upper and lower portions movable relative to each other to provide a substantial height adjustment for the bed, the lower portion including two longitudinal members and at least one cross member connecting the longitudinal members;

UNITED STATES PATENT AND TRADEMARK OFFICE
CERTIFICATE OF CORRECTION

PATENT NO. : 5,269,388
DATED : December 14, 1993
INVENTOR(S) : Keith Reichow et al.

It is certified that error appears in the above-indentified patent and that said Letters Patent is hereby corrected as shown below:

Column 6, claim 1.

at least one load cell rigidly connected to each longitudinal member of the lower portion;

rigid load cell brackets connected, respectively, to the load cells and extending for a substantial portion of the length of the bed; and     linking means connecting the opposing ends of each bracket to the upper portion of the bed assembly in a manner to permit substantial movement of the two portions relative to each other and such that the load cells are responsive to the weight of the patient on the bed assembly.

Signed and Sealed this

Sixth Day of September, 1994

Attest:

BRUCE LEHMAN

*Attesting Officer*  *Commissioner of Patents and Trademarks*